US009607243B1

(12) United States Patent
Brualla et al.

(10) Patent No.: US 9,607,243 B1
(45) Date of Patent: Mar. 28, 2017

(54) TIME-LAPSED IMAGE SEQUENCE GENERATION

(71) Applicant: Google Inc., Mountain View, CA (US)

(72) Inventors: Ricardo Martin Brualla, Seattle, WA (US); David Robert Gallup, Bothell, WA (US); Steven Maxwell Seitz, Seattle, WA (US)

(73) Assignee: Google Inc., Mountain View, CA (US)

( * ) Notice: Subject to any disclaimer, the term of this patent is extended or adjusted under 35 U.S.C. 154(b) by 87 days.

(21) Appl. No.: 14/591,256

(22) Filed: Jan. 7, 2015

Related U.S. Application Data

(60) Provisional application No. 62/062,377, filed on Oct. 10, 2014.

(51) Int. Cl.
| | | |
|---|---|---|
| *G06K 9/00* | (2006.01) | |
| *G06K 9/62* | (2006.01) | |
| *G06T 7/00* | (2017.01) | |
| *G06T 5/10* | (2006.01) | |

(52) U.S. Cl.
CPC .............. *G06K 9/6202* (2013.01); *G06T 5/10* (2013.01); *G06T 7/0024* (2013.01)

(58) Field of Classification Search
None
See application file for complete search history.

(56) References Cited

U.S. PATENT DOCUMENTS

| | | | |
|---|---|---|---|
| 4,779,095 A | 10/1988 | Guerreri | |
| 5,083,860 A | 1/1992 | Miyatake et al. | |
| 5,548,659 A | 8/1996 | Okamoto | |
| 6,222,952 B1 | 4/2001 | Moran et al. | |
| 6,587,119 B1 | 7/2003 | Anderson et al. | |
| 7,653,264 B2 | 1/2010 | Hero et al. | |
| 2002/0090127 A1* | 7/2002 | Wetzel | G01B 7/003 |
| | | | 382/133 |
| 2005/0151254 A1 | 7/2005 | Narazaki | |
| 2010/0239123 A1* | 9/2010 | Funayama | G06T 7/0081 |
| | | | 382/103 |
| 2012/0262481 A1* | 10/2012 | Allen | A45D 44/005 |
| | | | 345/629 |

(Continued)

OTHER PUBLICATIONS

Dontcheva et al., "Interactive Digital Photomontage", copyright 2004, pp. 294-302.

(Continued)

*Primary Examiner* — Nancy Bitar
(74) *Attorney, Agent, or Firm* — Lerner, David, Littenberg, Krumholz & Mentlik, LLP

(57) ABSTRACT

Aspects of the disclosure relate to providing users with sequences of images of physical locations over time or time-lapses. In order to do so, a set of images of a physical location may be identified. From the set of images, a representative image may be selected. The set may then be filtered by comparing the other images in the set to the representative image. The images in the filtered set may then be aligned to the representative image. From this set, a time-lapsed sequence of images may be generated, and the amount of change in the time-lapsed sequence of images may be determined. At the request of a user device for a time-lapsed image representation of the specified physical location, the generated time-lapsed sequence of images may be provided.

20 Claims, 12 Drawing Sheets

(56) References Cited

U.S. PATENT DOCUMENTS

| | | | |
|---|---|---|---|
| 2013/0155058 A1* | 6/2013 | Golparvar-Fard | .... G06T 19/006 345/419 |
| 2015/0223703 A1* | 8/2015 | Abd-Elmoniem | ... A61B 5/7207 600/413 |

OTHER PUBLICATIONS

"Panorama Tools", PanoTools.org, retrieved from <http://hugin.sourceforge.net/docs/manual/Panorama_tools.html>, downloaded on Oct. 14, 2014.

"Panolapse: Timelapse in Motion", retrieved from <http://www.panolapse360.com/>, downloaded on Oct. 14, 2014.

\* cited by examiner

| Image Identifier | 3D Points |
|---|---|
| 310 | A, B, C, D, . . . |
| 320 | A, B, D, E, . . . |
| 330 | A, C, F, G, . . . |
| 340 | B, H, I, J, . . . |
| 350 | C, H, J, K, . . . |
| 360 | L, M, N, O, . . . |
| ... | ... |
| N | V, W, X, Y, . . . |

TIME-LAPSED IMAGE SEQUENCE GENERATION

CROSS REFERENCE TO RELATED APPLICATIONS

This application claims the benefit of the filing date of U.S. Provisional Patent Application No. 62/062,377 filed Oct. 10, 2014, the disclosure of which is hereby incorporated herein by reference.

BACKGROUND

Various systems may provide users with images of different locations. Some systems may provide users with time-lapse experiences using carefully captured image sequences. A time-lapse may include a sequence of images of a location or object taken over time. Some systems include tools for generating time-lapses that are geared to short time-lapses, of timespans lasting minutes to hours in most cases. In some examples, the sequences of images are captured from cameras that are static, by using a tripod or a panning mechanism. Thus, these systems may not be useful for images captured by cameras from different viewpoints.

SUMMARY

Aspects of the disclosure provide a method for generating and providing time-lapsed sequences of images. The method includes identifying, by one or more computing devices, a set of images of a physical location; selecting, by the one or more computing devices, a representative image of the set of images; filtering, by the one or more computing devices, the set of images by comparing each image of the set of images to the representative image; aligning, by the one or more computing devices, the images of the filtered set of images to the representative image; generating, by the one or more computing devices, a time-lapsed sequence of images based on the aligned filtered set of images; determining, by the one or more computing devices, a change value for the time-lapsed sequence of images based on a comparison of the images of the aligned filtered set of images; and, in response to a request from a user computing device for a time-lapsed image representation of the physical location, providing, using the one or more computing devices, the time-lapsed sequence of images.

In one example, the representative image is selected based on pairwise similarity values between each of the images of the set of images. In another example, generating the time-lapsed sequence of images includes organizing the images of the aligned filtered set of images based on timestamp information associated with each image of the aligned filtered set of images. In another example, determining the change value includes: between each pixel of sequential images in the time-lapsed sequence of images, determining a variance value; identifying a first subset of images of the time-lapsed sequence of images and a second subset of images in the time-lapsed sequence of images where variance values between pixels of sequential images are lowest; and determining a time split variance value between the first subset of images and the second subset of images. In this example, the change value is based on the time split variance value. Also in this example, the second subset of images are arranged after the first subset of images of the time-lapsed sequence of images and the time split variance value is determined between a last image in time in the first subset of images and a first image in time in the second set of images. In another example, the method also includes determining, by one or more computing devices, variance values between pixels of sequential images in the time-lapsed sequence of images and filtering, by one or more computing devices, the time-lapsed sequence of images to remove images based on the variance values. In another example, generating the time-lapsed sequence of images further includes averaging pixel values over two or more images of the aligned filtered set of images.

Other aspects of the disclosure provide a system comprising one or more computing devices. The one or more computing devices are configured to identify a set of images of a physical location, select a representative image of the set of images, filter the set of images by comparing each image of the set of images to the representative image, align the images of the filtered set of images to the representative image, generate a time-lapsed sequence of images based on the aligned filtered set of images, determine a change value for the time-lapsed sequence of images based on a comparison of the images of the aligned filtered set of images, and, in response to a request from a user computing device for a time-lapsed image representation of the physical location, provide the time-lapsed sequence of images.

In one example, the representative image is selected based on pairwise similarity values between each of the images of the set of images. In another example, the one or more computing devices are also configured to generate the time-lapsed sequence of images by organizing the images of the aligned filtered set of images based on timestamp information associated with each image of the aligned filtered set of images. In another example, the one or more computing devices are also configured to determine a change value by: determining a variance value between each pixel of sequential images in the time-lapse; identifying a first subset of images of the time-lapsed sequence of images and a second subset of images in the time-lapsed sequence of images where variance values between pixels of sequential images are lowest; and determining a time split variance value between the first subset of images and the second subset of images. In this example, the change value is based on the time split variance value. Also in this example, the second subset of images are arranged after the first subset of images of the time-lapsed sequence of images and the time split variance value is determined between a last image in time in the first subset of images and a first image in time in the second set of images. In another example, the one or more computing devices are also configured to determine variance values between pixels of sequential images in the time-lapsed sequence of images and filter the time-lapsed sequence of images to remove images based on the variance values. In another example, the one or more computing devices are also configured to generate the time-lapsed sequence of images by averaging pixel values over two or more images of the aligned filtered set of images.

Further aspects of the disclosure provide a non-transitory, tangible machine readable medium on which instructions are stored. The instructions, when executed by one or more processors, cause the one or more processors to perform a method. The method includes identifying a set of images of a physical location; selecting a representative image of the set of images; filtering the set of images by comparing each image of the set of images to the representative image; aligning the images of the filtered set of images to the representative image; generating a time-lapsed sequence of images based on the aligned filtered set of images; determining a change value for the time-lapsed sequence of images based on a comparison of the images of the aligned filtered set of images; and, in response to a request from a user computing device for a time-lapsed image representation of the physical location, providing the time-lapsed sequence of images.

In one example, the method also includes generating the time-lapsed sequence of images by organizing the images of the aligned filtered set of images based on timestamp information associated with each image of the aligned filtered set of images. In another example, the method also includes determining a change value by: between each pixel of sequential images in the time-lapsed sequence of images, determining a variance value; identifying a first subset of images of the time-lapsed sequence of images and a second subset of images in the time-lapsed sequence of images where variance values between pixels of sequential images are lowest; and determining a time split variance value between the first subset of images and the second subset of images. In this example, the change value is based on the time split variance value. Also in this example, the second subset of images are arranged after the first subset of images of the time-lapsed sequence of images and the time split variance value is determined between a last image in time in the first subset of images and a first image in time in the second set of images. In another example, the method also includes determining variance values between pixels of sequential images in the time-lapsed sequence of images and filtering the time-lapsed sequence of images to remove images based on the variance values. In another example, the method also includes generating the time-lapsed sequence of images by averaging pixel values over two or more images of the aligned filtered set of images.

BRIEF DESCRIPTION OF THE DRAWINGS

FIG. 4 is a table showing example 3D points identified in images of a location in accordance with aspects of the disclosure.

DETAILED DESCRIPTION OVERVIEW

Figure 1:
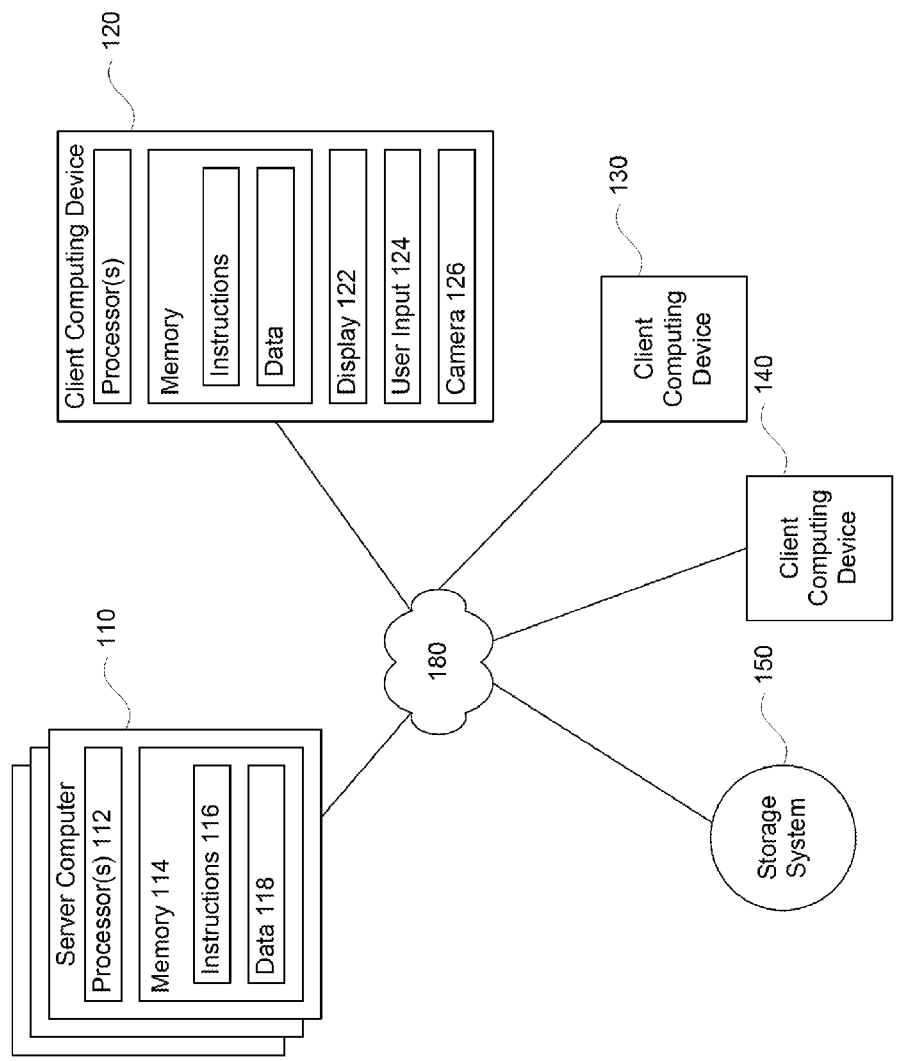
FIG. 1 is a functional diagram of an example system in accordance with aspects of the disclosure.

The technology relates to creating and providing sequences of images of locations taken over time, or time-lapses. In this regard, a user may be able to request and view a time-lapse of a particular location. As the images are displayed in sequence, the user may also view the changes to that location over time. In order to provide such time-lapses, images of a certain location may be taken from a variety of positions and angles and over the course of a span of time (e.g., several years). Such images may be received from a plurality of different sources. In order to allow a user to view a smooth and visually interesting time-lapse, the images may be selected for the time-lapse based on similarity of viewpoint, organized in chronological order, and aligned to show a same view from the same position and angle. In order to improve the viewing experience, images that are out of place, too close in time, or too similar to neighboring images may be filtered or otherwise removed from the images of the time-lapse.

In order to generate a time-lapse, images of a specific location may be accessed. For example, such images may include one or more of landscapes, landmarks, a building, a room, etc. These image files may be associated with other information, such as an image identifier that can be used to retrieve the image, the time the image was created, where the image was taken, from what angle the image is being viewed, and image format (JPEG, TIFF, etc.). The image file may contain a timestamp with a date and the time of when the image was captured. It may also contain pose information including orientation and location, such as the latitude and longitude, for the camera at the time the image was captured.

The images may be processed to identify three-dimensional (3D) points on the surfaces of objects in the images using, for example, structure from motion techniques. Images with similar visibility information may be grouped together, for example, based on the pairwise similarity between images. Within each group of images, a representative image may be identified. The selection may be made by choosing the image closest in pairwise similarity with the rest of the images in the group.

A group of images may be filtered to remove images that are too dissimilar to the representative image. In one example, the angle between the position of the camera that captured the representative image and a camera that captured another image of the group may be determined. This angle may then be compared to a threshold value to determine whether to keep or remove that image from the group. In addition or alternatively, images may be filtered by distance between the camera that captured the image and one or more 3D points in the image.

The filtered group of images may be aligned with one another. This aligning may include modifying the images so that the difference in angle between the images in the group and the representative image is effectively eliminated. In addition or alternatively, 3D reconstruction and warping of the images and/or methods of shift parallax correction may be used. These methods may further help to orient the images in the same position and angle and achieve an overall more fluid time-lapse.

The images of the group may also be organized chronologically by using the timestamp information in the image file. Thus, images that do not have a timestamp or that are too far removed in time from the other images may also be filtered or removed from a group. The resulting groups of images may each form a time-lapse that can be provided to users as described above.

In order to identify those time-lapses that are most interesting to users, each time-lapse may be evaluated to identify a change value for that time-lapse. This change value may be based on an assumption that pixel values at a given pixel location in a time-lapse will change at least once between sequential images of the time-lapse. A time split between two images of the time-lapse may be identified for each pixel. This time split may define two groups of images where the variances within each of the groups are at their lowest for the time-lapse. A change value for each pixel may be determined by calculating the difference between the variance of all the pixel values for a pixel and the sum of the variance values on either side of the time split. The mean of the change values for all the pixels in the image may then be designated as the change value for the time-lapse. This change value may be used to compare the amount of change between different time-lapses and thereby identify more interesting time-lapses or rather, those time-lapses that depict relatively more change than other time-lapses.

If a time-lapse undergoes multiple changes over time, assuming a single time split may not accurately reflect how interesting the time-lapse actually is. If a single time split is identified, the variance values on both sides of the time split may be high due to ongoing changes in the pixels. Therefore, in some alternative embodiments, multiple time splits may be identified for a given time-lapse. The variance values at these multiple time splits may then be used to determine an overall change value for the given time-lapse as described above.

The time-lapses may be further processed to improve the viewing experience. For example, the time span of the time-lapse may be narrowed to where more meaningful change in the images is detected. In order to do so, the variance of pixel values in a time-lapse may be determined as described above. Any images at the beginning or end of the time-lapse where there is very little variance (low variance values) in each pixel for an extended period of time or two or more images may be discarded from the time-lapse. Additionally or alternatively, times for each pixel where the variance before and after are at the lowest and the highest may be computed and used to filter or remove images from a time-lapse.

The time-lapse may be further calibrated for final presentation by discarding images that are outliers and averaging pixel values for each pixel (e.g., color, etc.). For example, using a sliding window technique, each pixel of each image in the time-lapse may be changed to the average of that same pixel in any images within the sliding window. As an alternative, the images of a time-lapse may be organized into a number of time range buckets where the images in each bucket are averaged together.

The features described herein may allow for images from different sources, positions, orientations, and times to be used to create a smooth and visually interesting time-lapse. They may also allow for transient objects and changes to be eliminated from the time-lapse; therefore allowing the more significant changes in the scene to play out more clearly. As such, these features may be especially useful in creating time-lapses over a large time span where it may be difficult to leave a camera in the same position for such a long length of time. The end result of such a method of creating a time-lapse may provide a user with a pleasing view of a scene as it changes over the course of time.

Example Systems

Figure 2:
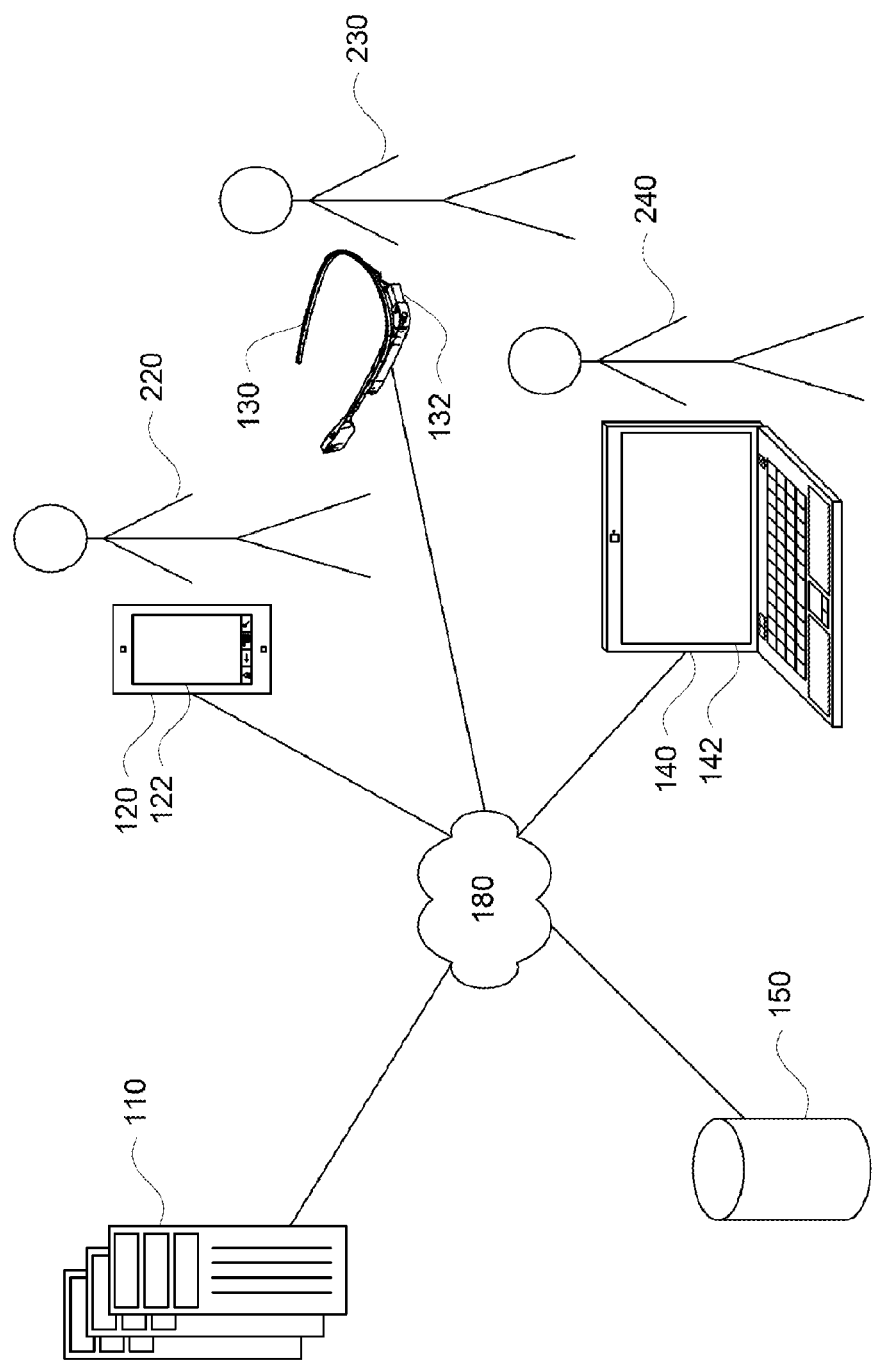
FIG. 2 is a pictorial diagram of the example system of FIG. 1.

FIGS. 1 and 2 include an example system 100 in which the features described herein may be implemented. It should not be considered as limiting the scope of the disclosure or usefulness of the features described herein. In this example, system 100 can include one or more computing devices 110, 120, 130, and 140, as well as storage system 150. One or more computing devices 110 can contain one or more processors 112, memory 114 and other components typically present in general purpose computing devices. Memory 114 of the one or more computing devices 110 can store information accessible by one or more processors 112, including instructions 116 that can be executed by the one or more processors 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Data 118 can be retrieved, stored or modified by processor 112 in accordance with the instructions 116. For instance, although the subject matter described herein is not limited by any particular data structure, the data can be stored in computer registers, in a relational database as a table having many different fields and records, or structured (e.g., XML documents). The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can include any conventional processors, such as a commercially available CPU. Alternatively, the processor can be a dedicated component such as an ASIC or other hardware-based processor. Although not necessary, one or more computing devices 110 may include specialized hardware components to perform specific computing processes, such as decoding video, matching video frames with images, distorting videos, encoding distorted videos, etc. faster or more efficiently.

Although FIG. 1 functionally illustrates the processor(s), memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in one or more housings different from those of the one or more computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm. Yet further, although some functions described below are indicated as taking place on a single computing device having a single processor, various aspects of the subject matter described herein can be implemented by a plurality of computing devices, for example, communicating information over network 180.

The one or more computing devices 110 can be at various nodes of a network 180 and capable of directly and indirectly communicating with other nodes of network 180. Although only a few computing devices are depicted in FIGS. 1-2, it should be appreciated that a typical system can include a large number of connected computing devices, with each different computing device (as well as collection device) being at a different node of the network 180. The network 180 and intervening nodes described herein can be interconnected using various protocols and systems, such that the network can be part of the Internet, World Wide Web, specific intranets, wide area networks, or local networks. The network can utilize standard communications protocols, such as Ethernet, Wi-Fi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, the one or more computing devices 110 may include one or more web servers that are capable of communicating with storage system 150 as well as computing devices 120, 130, and 140 via the network. For example, one or more server computing devices 110 may use network 180 to transmit and present information to a user, such as user 220, 230, or 240, on a display, such as displays 122, 132, or 142 of computing devices 120, 130, or 140. In this regard, computing devices 120, 130, and 140 may be considered client computing devices and may perform all or some of the features described below.

Each of the client computing devices may be configured similarly to the server computing devices 110, with one or more processors, memory and instructions as described above. Each client computing device 120, 130 or 140 may be a personal computing device intended for use by a user 220, 230, 240, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touch screen or microphone). The client computing device may also include a camera 126 for recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

Storage system 150 may store various types of information. As described in more detail below, the storage system 150 may store various images. For example, such images may include one or more of landscapes, landmarks, a building, a room, etc. These images may be part of image files that are associated with other information, such as an image identifier that can be used to retrieve the image, the time the image was created, where the image was taken, from what angle the image is being viewed, and image format (JPEG, TIFF, etc.). The image file may contain a timestamp with information such as a date and the time of when the image was captured. The image file may also contain pose information including geographic location information indicating the location (such as latitude and longitude or other location coordinates), and orientation information (heading) at which the image was captured (e.g., which part of the image is oriented towards "North", etc.).

The storage system 150 may also store 3D geometry data and algorithms for analyzing and manipulating images. As explained above and described in more detail below, this 3D geometry data may correspond to points on the surface of any objects in the images of storage system 150.

As with memory 114, storage system 150 can be of any type of computerized storage capable of storing information accessible by server 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 180 as shown in FIG. 1 and/or may be directly connected to or incorporated into any of the computing devices 110-140 (not shown).

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 3:
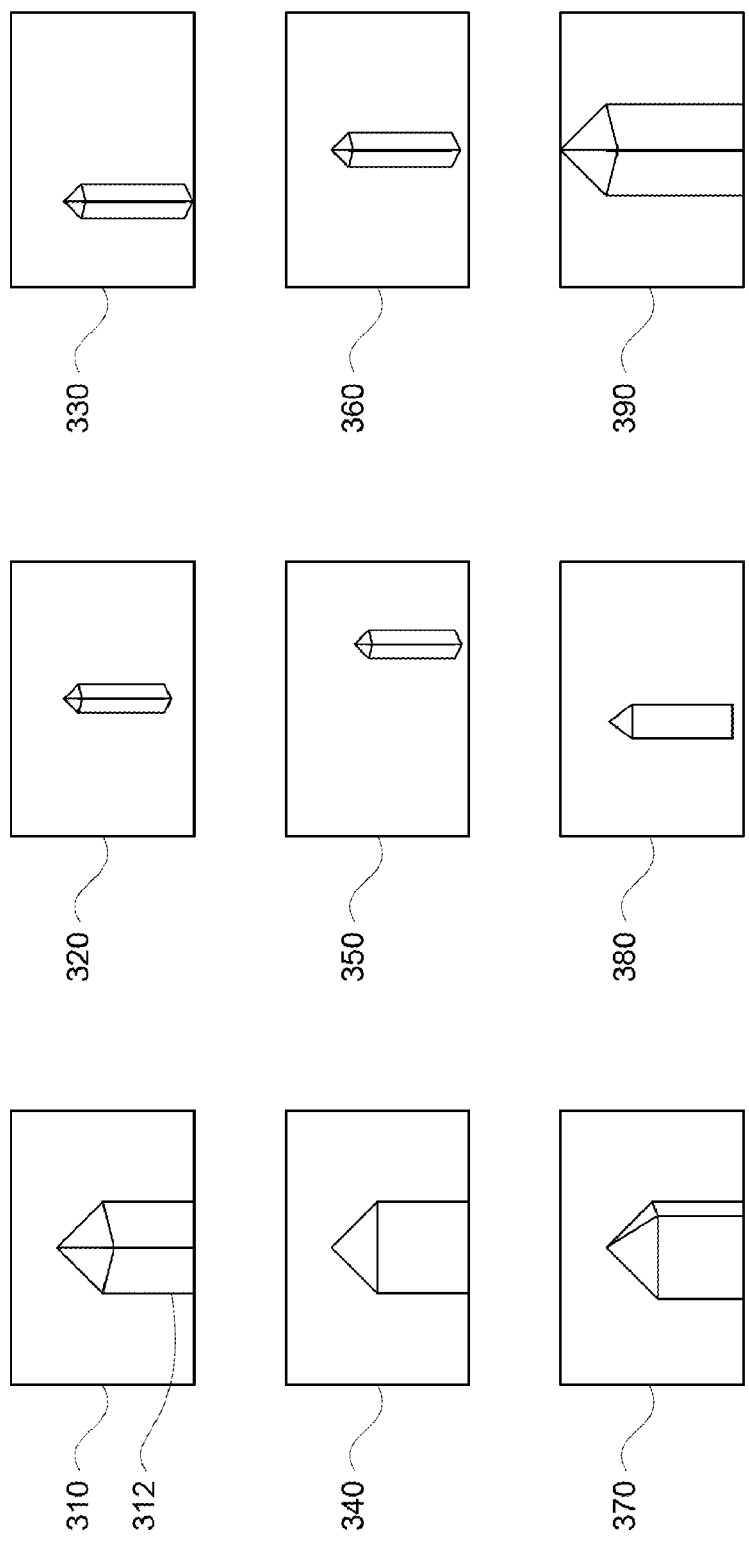
FIG. 3 is an example of images of a location in accordance with aspects of the disclosure.

In order to generate a time-lapse, images of a specific location may be accessed by the one or more server computing devices 110. For example, the location may be identified from a predetermined list, from the number of images associated with the location, from a request received from a client computing device, by an operator, etc. FIG. 3 is an example 300 of various images 310, 320, 330, 340, 350, 360, 370, 380, 390 each associated with location information corresponding to or within a given geographic area. In this example, each of the images includes a common point of interest or monument 312.

The images may be processed by the one or more server computing devices 110 to identify 3D geometry date including 3D points on the surfaces of objects in the images. For example, various techniques such as structure from motion algorithms may be used to identify 3D points. Alternatively, this information may be predetermined and associated with each image. In this regard, the 3D geometry data may be retrieved from storage system 150.

In some examples, the 3D geometry data may include visibility information for the 3D points of each image. Visibility information may include a set of 3D points on the surface of objects that are visible in a given image or a 3D model reconstruction of the surfaces of the given image. As an example, such visibility information may be determined by the one or more server computing devices 110 by using structure from motion techniques. As an example, Table 400 lists sets of 3D points that are visible in various images of storage system 150. As shown in FIG. 4, at least 3D points A, B, C, and D are visible in image 310 whereas different sets of 3D points are visible in different of the images of Table 400. In this regard, different images of the monument 312 may have different visibility information for the various 3D points corresponding to the surfaces of the monument 312.

Figure 5:
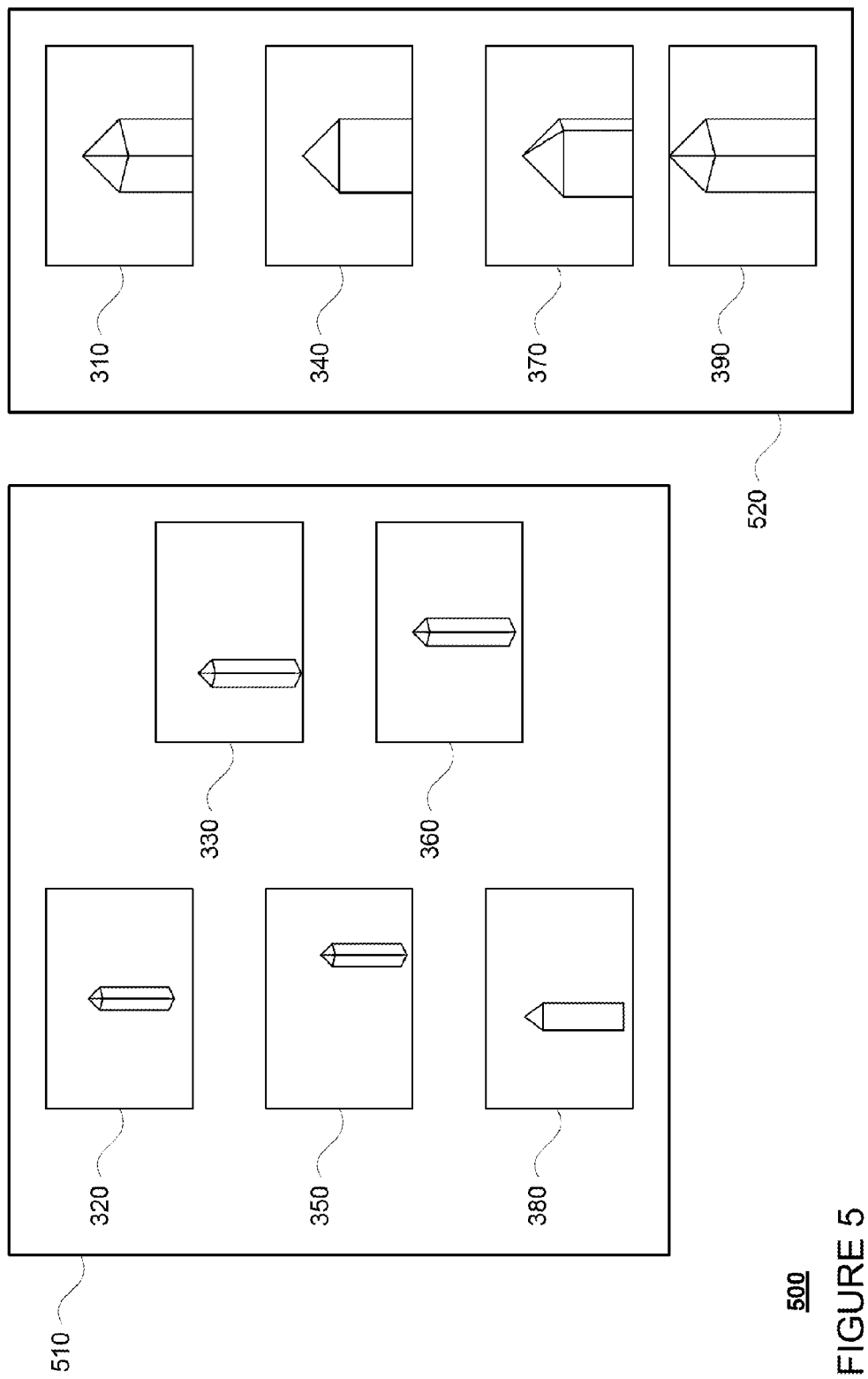
FIG. 5 is an example of groups of images formed in accordance with aspects of the disclosure.

Images with similar visibility information may be grouped together by the one or more server computing devices 110. For example, measuring the pairwise similarity between images, the images with substantially the same 3D points in similar orientations may be grouped or clustered together as seen in FIG. 5. FIG. 5 is an example 500 of two groups of images, group 510 and group 520. Images 320, 330, 350, 360, and 380 contain the 3D points corresponding to both a top portion and a bottom portion of monument 312 (or rather the entire height of the monument) and may form a group 510. Similarly, images 310, 340, 370, and 390 include 3D points corresponding to the top portion of the monument and not the bottom portion of the monument. Thus images 310, 340, 370, and 390 may form another group 520.

Figure 6:
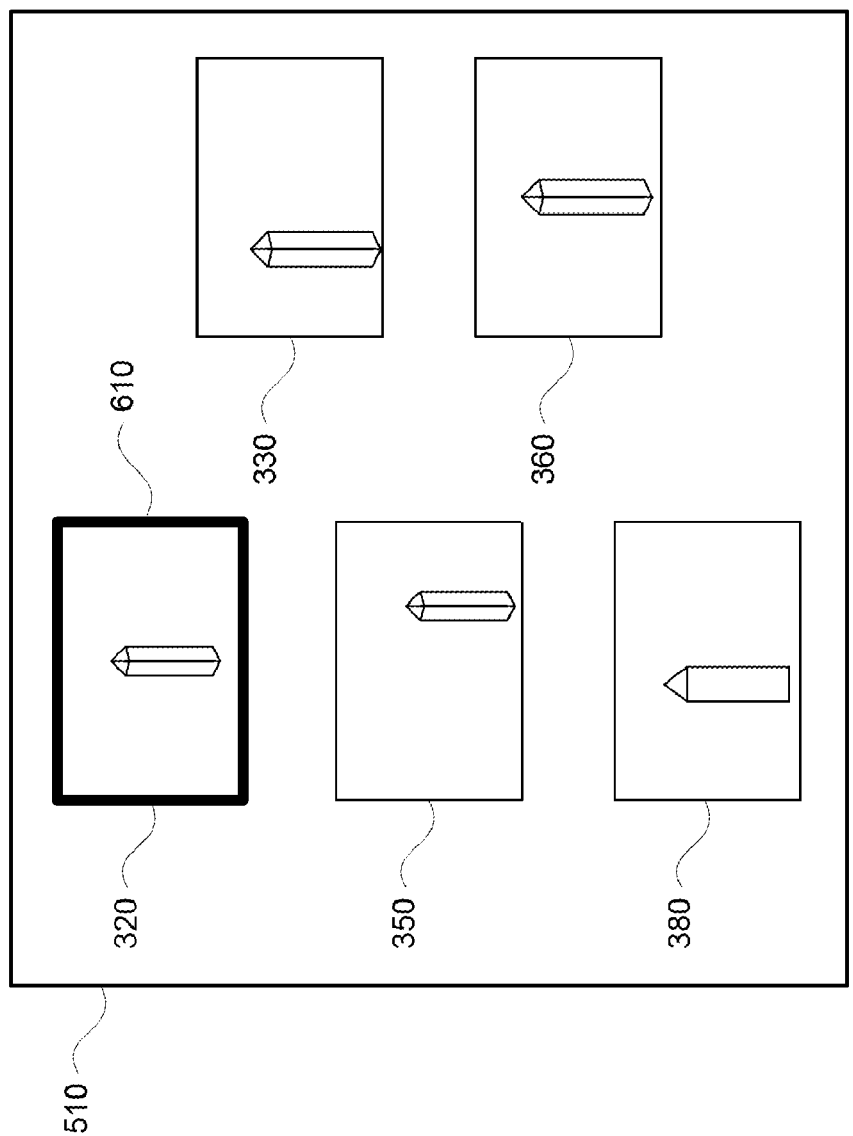
FIG. 6 is an example of a representative image selected for a group of images in accordance with aspects of the disclosure.

Within each group of images, a representative image may be identified by the one or more server computing devices 110. For example, techniques used to identify conical views may be used to select a representative image. In this regard, the selection may be made by choosing the image closest in pairwise similarity with the rest of the images in the group. FIG. 6 is an example 600 indicating that image 320 has been selected as a representative image 610 for group 510.

Figure 7:
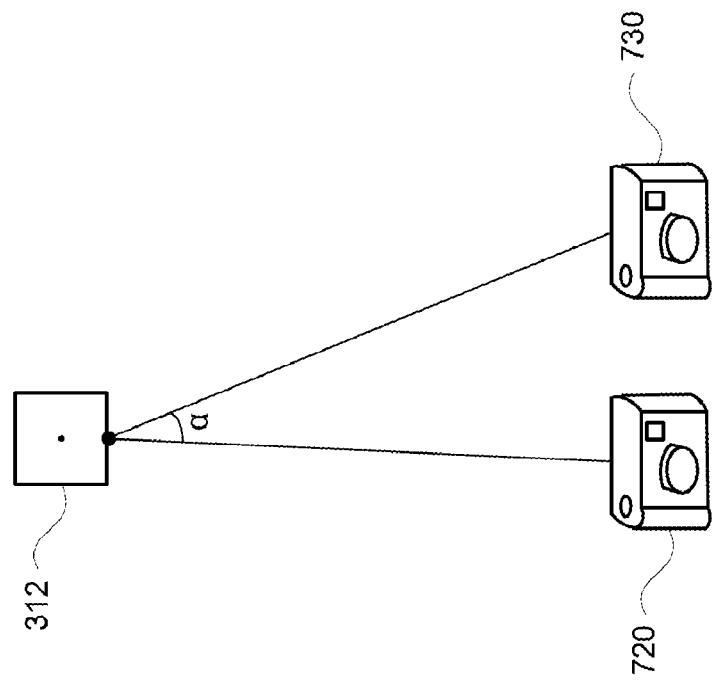
FIG. 7 is a pictorial diagram of the angle between two cameras which capture images of a location.

A group of images may be filtered by the one or more server computing devices 110 in order to remove images that are too dissimilar to the representative image. As noted above, in one example, an angle between the camera that captured the representative image and a camera that captured a second image of the group may be determined and compared to a threshold value in order to determine whether the image should be kept or removed from the group. This angle may then be compared to a threshold value, such as 5 degrees or more or less, to determine whether to keep or remove that image from the group. As an example, if the angle $\alpha$ is greater than or equal to 5 degrees, then the second image may be removed or filtered from the group 510. Similarly, if the angle $\alpha$ is less than 5 degrees, then the second image may be kept within the group. For example, as seen in example 700 of FIG. 7, the angle $\alpha$ between the position of the camera 730 that captured the representative image 610 and a camera 720 that captured, for example, image 330 of the group 510 may be determined. Here, the angle $\alpha$ may be greater than 5 degrees, and thus, as shown in example 800 of FIG. 8 demonstrates that image 330 has been removed from the group 510 (as compared to group 510 of FIG. 6). In this regard, image 380 may also be removed from group 510 using a similar technique.

In addition or alternatively, a group of images may be filtered by the one or more server computing devices 110 based on the distance between the camera that captured the image and one or more 3D points within the image and/or the representative image. In this regard, images that are closer than a closeness threshold to a 3D point as compared to the distance to the 3D point in the representative image or farther than a farness threshold to a 3D point as compared to the distance to the 3D point in the representative image may be filtered from the group of images. However, this method may become less useful where the image is of something that moves or varies over time.

Figure 8:
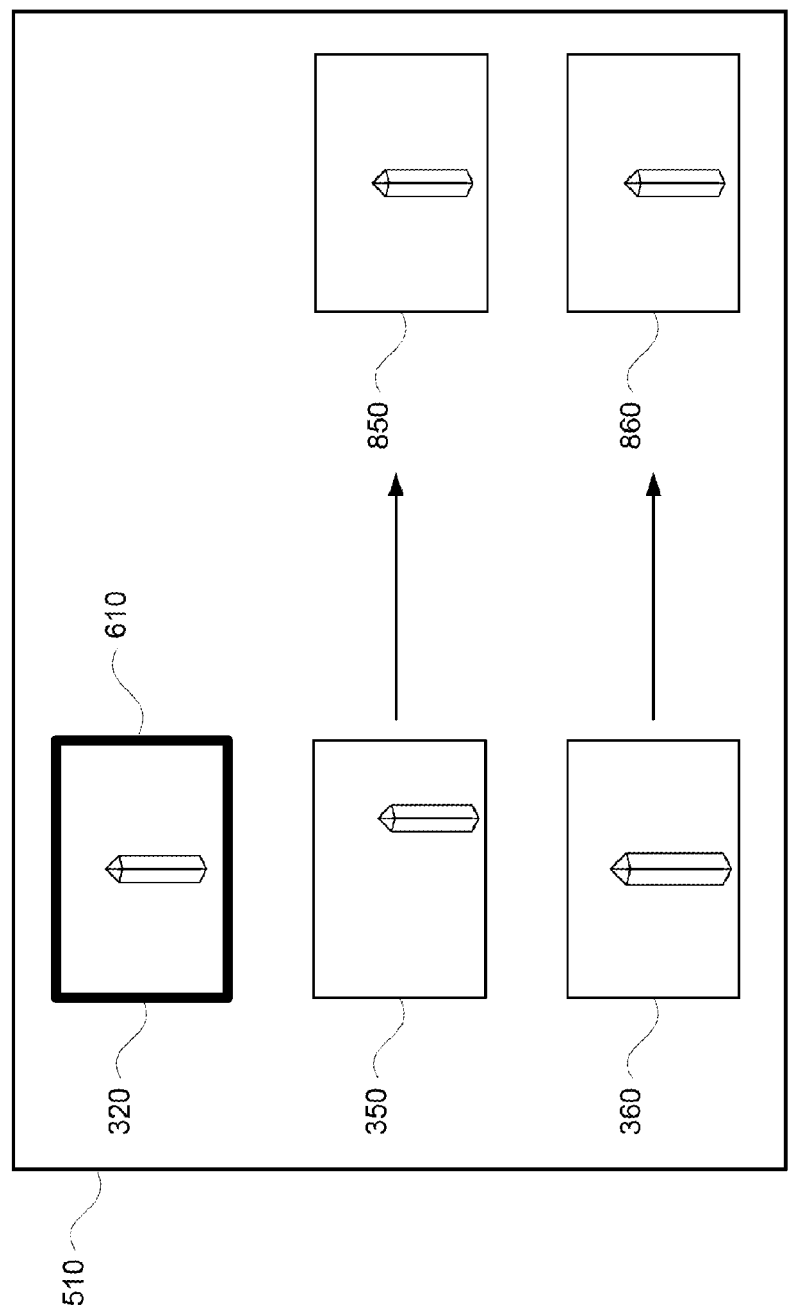
FIG. 8 is an example of how images are aligned in accordance with aspects of the disclosure.

The filtered group of images may also be aligned with one another by the one or more server computing devices 110. This aligning may include modifying the images so that the difference in angle between the images in the group and the representative image is effectively eliminated. This may include estimating a homography between a set of 2D projections of 3D points visible in the representative image into both the images of the group and the representative image. As a result, the 3D points of one image may be adjusted to be in the same orientation as the 3D points in the representative image. FIG. 8 is an example 800 depicting the adjustment in angle and distance of images 350 and 360 to more closely resemble representative image 610. Thus, adjusted image 850 corresponds to image 350 and adjusted image 860 corresponds to image 360. As can be seen from the example 800, each modified image may have the same number of pixels or aspect ratio as the representative image.

In addition, or alternatively, 3D reconstruction and warping of the images and/or methods of shift parallax correction may be performed by the one or more server computing devices 110. These methods may further help to orient the images in the same position and angle and achieve an overall more fluid time-lapse.

The images of the group may also be arranged or organized chronologically by the one or more server computing devices 110 by using the timestamp information in the image file. As noted above, the timestamp information may include the date and time at which a particular image was captured. Thus, images that do not have a timestamp may also be filtered or removed from the group. Also, images that are too far removed in time from the other images may also be filtered or discarded. The resulting arrangement and group of images may each form a time-lapse that can be provided to users as described above.

Figure 9:
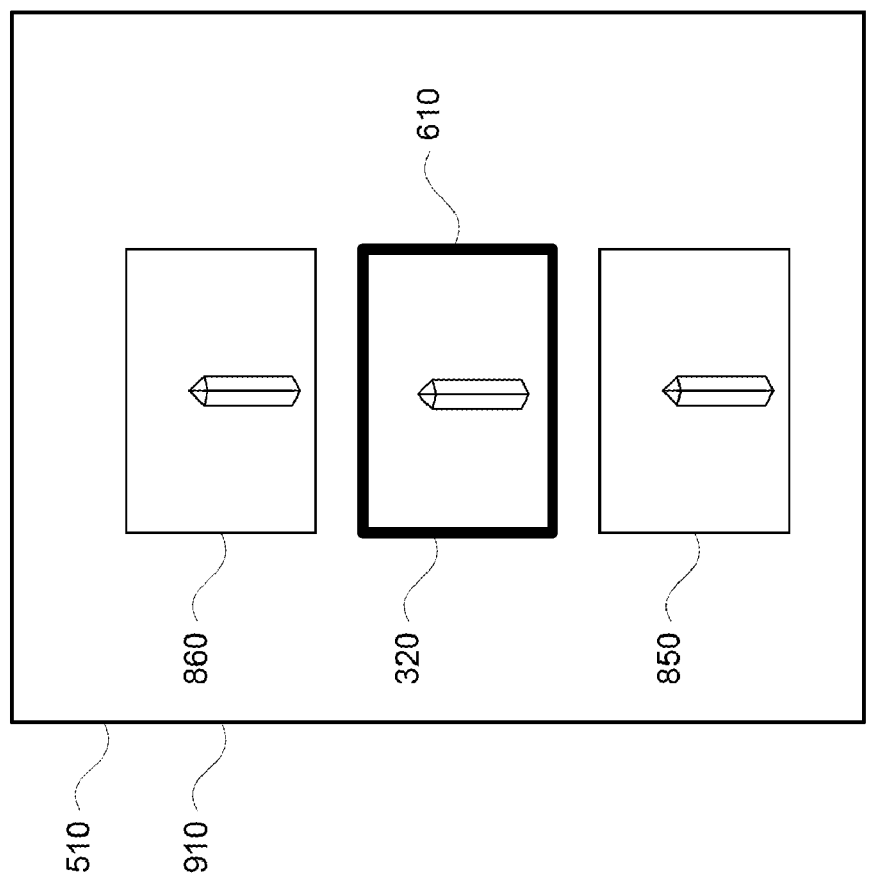
FIG. 9 is an example of how images are organized in a specified order in accordance with aspects of the disclosure

FIG. 9 is an example 900 of the filtered and adjusted images of group 510 arranged by timestamp from the earliest date and time to the latest date and time. In this regard, image 860 precedes image 320, followed by image 850. The images of group 510 may then be displayed in sequence according to the arrangement 910 shown in FIG. 9 as a completed time-lapse.

As noted above, each pixel of a time-lapse may be evaluated by the one or more server computing devices 110 to determine at least one time split between two images of the time-lapse. This time split may define two groups of images where the amount of change within each of the groups is at their lowest for the time-lapse. The amount of change between the pixel values, such as color, etc., of two corresponding pixels in sequential images of the time-lapse may be defined as a variance value. To identify a time split, the variance values on each "side" of the time split may be minimized. Once the time split is identified, the variance values between the pixels of the images on each side of the time split may then be determined. For example, in a time-lapse that includes the construction of a building, a given pixel at the beginning of the time-lapse may be part of the sky in the image. At a given time, the pixel may switch to being part of the newly constructed building. This may be identified as a time split, and the value of the variance before and after the time split may be assigned to the pixel.

A change value for each pixel may be determined by the one or more server computing devices 110 by calculating the difference between the variance values of all the pixel values for a given pixel and the sum of the variance values of that pixel on either side of the time split. The mean of the change values for all the pixels in the image may then be designated as the change value for the time-lapse. As an example, for a particular pixel at time t, the change value or change_magnitude may be determined from:

split_variance(p,t)=$\|$var(color(p, 1 . . . t−1))$\|$+$\|$var(color (p, t . . . $t_n$))$\|$;

change_time(p)=argmin_tsplit_variance(p,t);
change_magnitude(p)=∥var(color(p, 1 . . . $t_n$))∥−split_variance(p,change_time(p));

In this example, p is a pixel in the image; n is the number of images in the time-lapse sequence; $t_n$ is the maximum timestamp in the sequence; color(p, t) is the color of pixel p at time t; color(p, $t_1$ . . . $t_2$) is the set of colors of pixel p for the time range $t_1$ to $t_2$; and ∥var( )∥ is the $L^2$-norm of the variance (if color is vector-valued).

The average change value (or change_magnitude in the example above) over all of the pixels at the time split may then be designated as the change value for the time-lapse. This change value may be used to compare the amount of change between different time-lapses. A higher change value may indicate more variance within a time-lapse. In some examples, if the change value surpasses a specified threshold number, the time-lapse may be provided to a user for display. Alternatively, when a request for a time-lapse corresponding to a particular location is received from a client computing device, and multiple time-lapses are identified based on the particular location, the identified time-lapse having the greatest change value may be provided to the client computing device.

As noted above, rather than assuming a single time split, multiple time splits may be identified for a given time-lapse. For example, a pixel may switch from being part of the sky in the image, to part of a frame of a building, and subsequently to part of the window of the newly constructed building. This second point in time may be identified as a second time split for the time-lapse. The variance values at these multiple time splits may then be used to determine an overall change value for the time-lapse as described above.

As an example, for a particular pixel at time t, the change value or change_magnitude may be determined from:

split_variance(p,{$t_1$, $t_2$, $t_3$, . . . })=∥var(color(p, 1 . . . $t_1$−1))∥+∥var(color(p, $t_1$ . . . $t_2$−1))∥+∥var(color(p, $t_2$ . . . $t_3$−1))∥+∥var(color(p, $t_3$ . . . $t_n$))∥;
change_times(p)=argmin_{$t_1$, $t_2$, $t_3$, . . . }split_variance (p,{$t_1$, $t_2$, $t_3$, . . . });
change_magnitude(p)=∥var(color(p, 1 . . . $t_n$))∥−split_variance(p,change_times(p));

In this example, p is a pixel in the image; n is the number of images in the time-lapse sequence; $t_n$ is the maximum timestamp in the sequence; color(p, t) is the color of pixel p at time t; color(p, $t_1$ . . . $t_2$) is the set of colors of pixel p for the time range $t_1$ to $t_2$; and ∥var( )∥ is the $L^2$-norm of the variance (if color is vector-valued).

The time-lapses may be further processed by the one or more computing devices 110 to improve the viewing experience. For example, the time span of the time-lapse may be narrowed to where more meaningful change in the images is detected. In order to do so, the variance of pixel values in a time-lapse may be determined as described above. Any images at the beginning or end of the time-lapse where there is very little variance (low variance values) in each pixel for an extended period of time or two or more images may be discarded from the time-lapse.

Additionally or alternatively, times for each pixel where the variance before and after are at the lowest and the highest may be determined and used by the one or more server computing devices 110 to filter or remove images from a time-lapse. For example, using the formulas discussed above, the minimum and the maximum of the change_time (p) for all pixels p in the time-lapse may be computed. All images in the time-lapse that have timestamps less than the minimum change_time(p) and greater than the maximum change_time(p) may be removed from the time-lapse. Alternatively, percentile of change_time(p) may be determined in order to filter or remove images. For examples, all images with timestamps in the better $5^{th}$ or 95th percentile of change_time(p) may be removed from the time-lapse.

Figure 10:
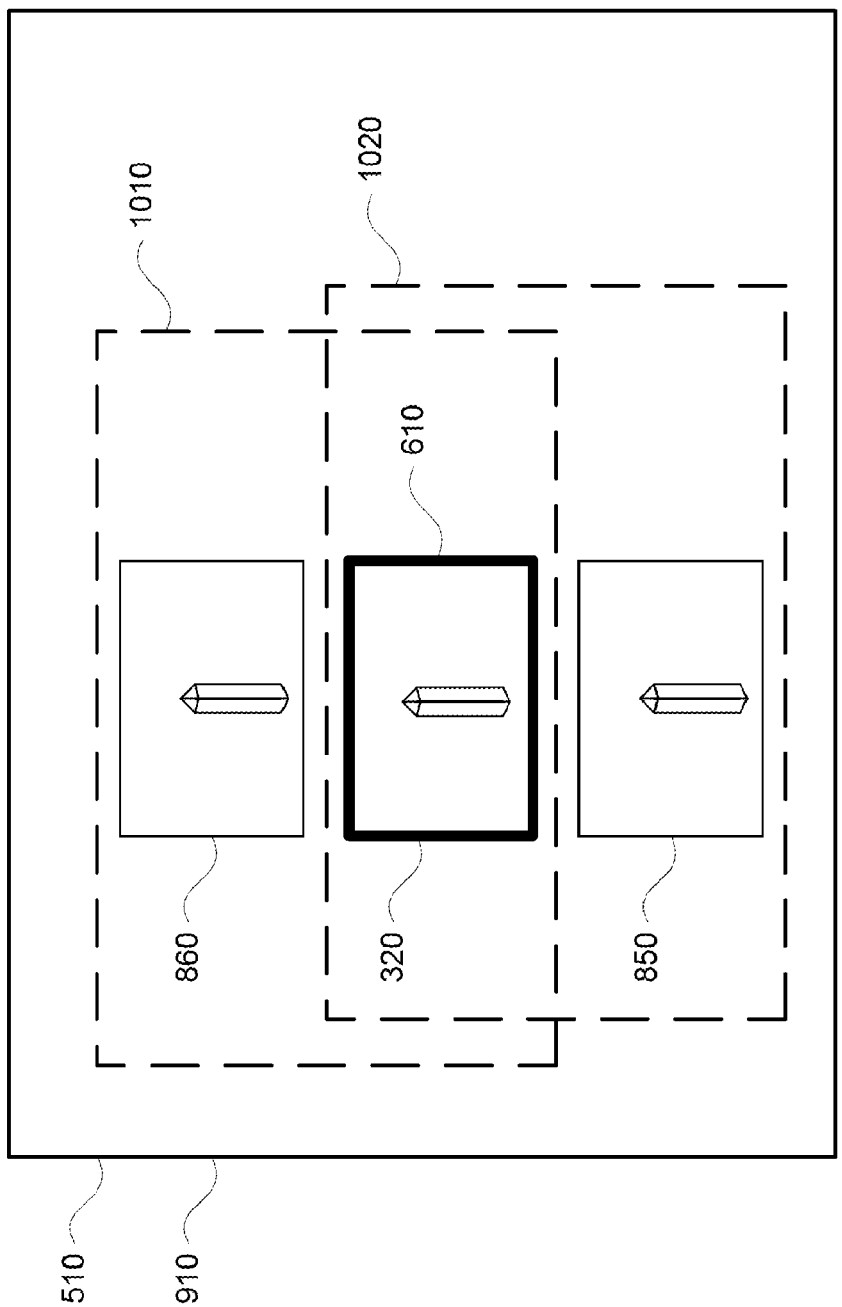
FIG. 10 is an example a sliding window in accordance with aspects of the disclosure.

The time-lapse may be further calibrated for final presentation by the one or more computing devices 110 by discarding images that are "outliers" and averaging pixel values for each pixel (e.g., color, etc.). This averaging may be especially useful when the timestamps of images are incorrect, such as where a tourist does not set the timestamp on their camera to the correct local time or where camera user may have left the factory default timestamp on their camera. For example, using a sliding window technique, each pixel of each image in the time-lapse may be changed to the average of that same pixel in any images within the sliding window. As shown in example 1000 of FIG. 10, the first window position 1010 includes images 860 and 320. The window then may "slide" to the second window position 1020, which contains images 320 and 850. Thus, the pixel values of corresponding pixels (e.g., in the same relative location of images 320 and 860) of the first window position may be averaged together in order to provide a first image for the time-lapse, while the pixel values of corresponding pixels (e.g., in the same relative location of images 850 and 320) of the second window position may be averaged together to provide a second image for the time-lapse.

The size or magnitude of the sliding window may be based on a number of images before and/or after the image or a distance in time before and/or after the image. In some examples, the number of images in the sliding window may be based upon the total number of images in the time-lapse or the total amount of time covered by the time-lapse.

Figure 11:
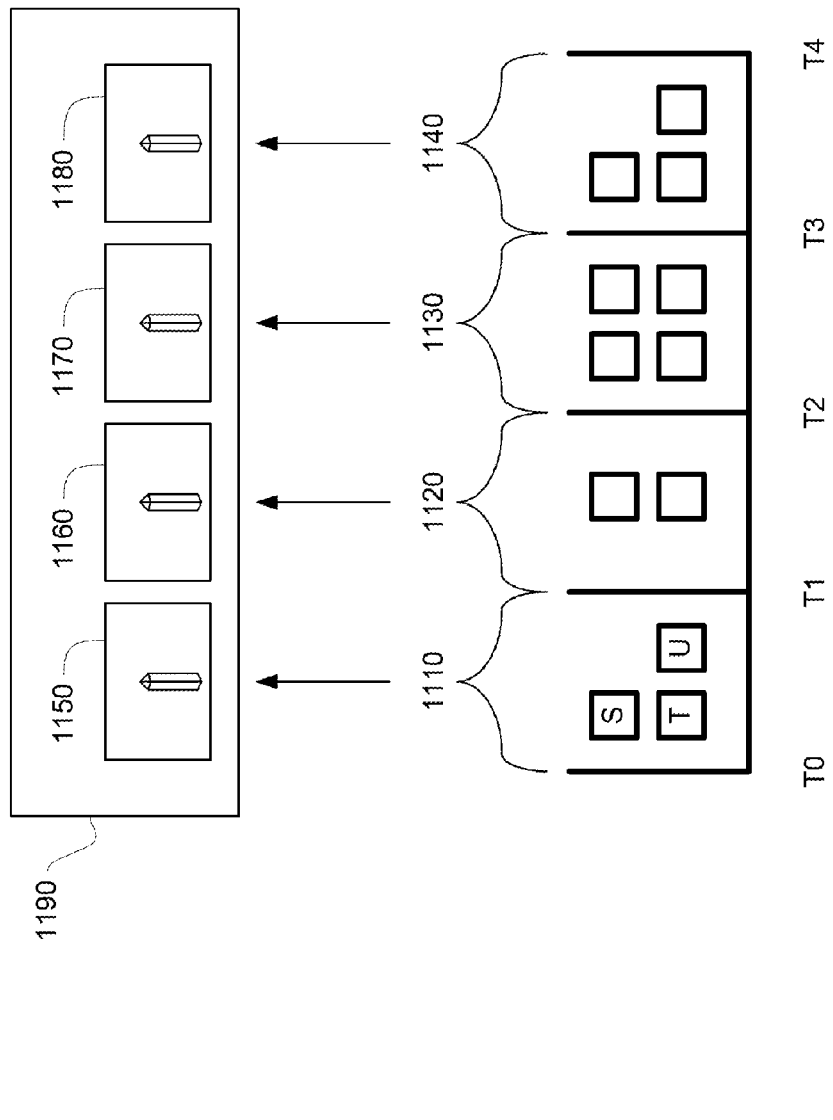
FIG. 11 is a pictorial diagram of images sorted according to time information in accordance with aspects of the disclosure.

As an alternative, the images of a time-lapse may be organized into a number of time range buckets where the images in each bucket are averaged together. As shown in FIG. 11, time bucket 1110 spans the time range between T0 and T1, bucket 1120 spans T1 and T2, bucket 1130 spans T2 and T3, and bucket 1140 spans T3 and T4. In this embodiment, the pixels values of corresponding images of the three images (depicted as squares S, T, and U) of bucket 1110 are averaged to produce image 1150. The same is done for the images of buckets 1120, 1130, and 1140 to produce images 1160, 1170, and 1180, respectively. The result is a group of images 1190 corresponding to a new time-lapse for the time range T0 to T4.

As noted above, the time-lapses may be provided to users for display. In order to do so, a user, such as user 220, may use client computing device 120 to request a time-lapse of a specified location. The specified location may include a point of interest or name of a location, a street address, geographic location coordinates (such as latitude and longitude), etc. This request may be sent to the one or more server computing devices 110. Upon receipt, one or more time-lapses may be identified and provided by the one or more server computing devices 110 to the client computing device 120. The one or more server computing devices 110 may also use the change values to identify which time-lapses to provide as described above.

For example, if a request for a time-lapse of the monument 312 is received by the one or more service computing devices, the one or more server computing devices may provide the images of group 510 as well as the arrangement 910 shown in FIG. 9 as a completed time-lapse. This information may then be used by the client computing device 120 to display the time-lapse to the user 220.

Figure 12:
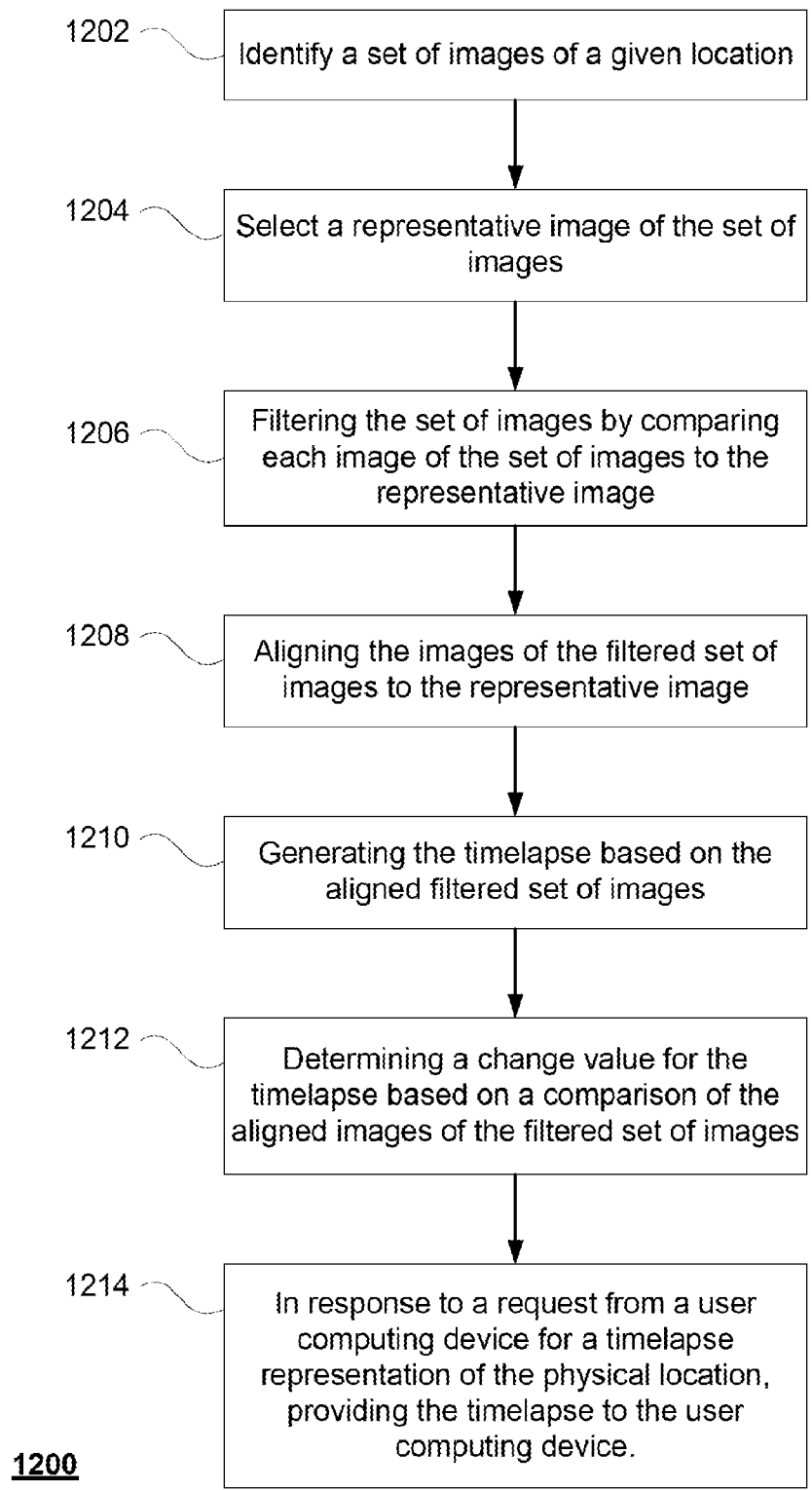
FIG. 12 is an example flow diagram in accordance with aspects of the disclosure.

FIG. 12 is an example flow diagram 1200 in accordance with some of the aspects described above that may be performed by one or more computing devices such as server computing devices 110. In one embodiment, a set of images of a given location is identified at block 1202. Then, a representative image of images is selected from the set of images at block 1204. Comparing each image in the set to the representative image, the set of images is filtered at block 1206. The images of the filtered set are aligned to the representative image at block 1208. The time-lapse is then generated based on the aligned filtered set of images at block 1210. Based on a comparison of the aligned images, a change value for the time-lapse is determined at block 1212. In response to a request from a user computing device for a time-lapse representation of the physical location, the time-lapse is provided to the user computing devise at block 1214.

Unless stated otherwise, the foregoing alternative examples are not mutually exclusive. They may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for generating and providing time-lapsed sequences of images, the method comprising:
    identifying, by one or more computing devices, a set of images of a physical location;
    selecting, by the one or more computing devices, a representative image of the set of images;
    filtering, by the one or more computing devices, the set of images by comparing each image of the set of images to the representative image;
    aligning, by the one or more computing devices, the images of the filtered set of images to the representative image;
    generating, by the one or more computing devices, a time-lapsed sequence of images based on the aligned filtered set of images;
    determining, by the one or more computing devices, a first value for the time-lapsed sequence of images based on changes in pixel values from one image in the sequence to the next image in the sequence at corresponding pixel locations; and
    in response to a request from a user computing device for a time-lapsed image representation of the physical location, providing, using the one or more computing devices, the time-lapsed sequence of images when the first value exceeds a threshold.

2. The method of claim 1, wherein the representative image is selected based on pairwise similarity values between each of the images of the set of images.

3. The method of claim 1, wherein filtering the set of images by comparing each image of the set of images to the representative image further comprises:
    determining an angle between a device that captured the representative image and a device that captured each respective image of the set of images; and
    removing any respective images where the angle between the device that captured the representative image and the device that captured the respective images is greater than a threshold angle value.

4. The method of claim 1, wherein generating the time-lapsed sequence of images includes organizing the images of the aligned filtered set of images based on timestamp information associated with each image of the aligned filtered set of images.

5. The method of claim 1, wherein determining the first value includes:
    between each pixel of sequential images in the time-lapsed sequence of images, determining a variance value;
    identifying a first subset of images of the time-lapsed sequence of images and a second subset of images in the time-lapsed sequence of images where variance values between pixels of sequential images are lowest; and
    determining a time split variance value between the first subset of images and the second subset of images, wherein the first value is based on the time split variance value.

6. The method of claim 1, further comprising:
    determining, by one or more computing devices, variance values between pixels of sequential images in the time-lapsed sequence of images; and
    filtering, by one or more computing devices, the time-lapsed sequence of images to remove images based on the variance values.

7. The method of claim 1, wherein generating the time-lapsed sequence of images further includes averaging pixel values over two or more images of the aligned filtered set of images.

8. A system comprising one or more computing devices configured to:
    identify a set of images of a physical location;
    select a representative image of the set of images;
    filter the set of images by comparing each image of the set of images to the representative image;
    align the images of the filtered set of images to the representative image;
    generate a time-lapsed sequence of images based on the aligned filtered set of images;
    determine a first value for the time-lapsed sequence of images based on changes in pixel values from one image in the sequence to the next image in the sequence at corresponding pixel locations; and
    in response to a request from a user computing device for a time-lapsed image representation of the physical location, provide the time-lapsed sequence of images when the first value exceeds a threshold.

9. The system of claim 8, wherein the representative image is selected based on pairwise similarity values between each of the images of the set of images.

10. The system of claim 8, wherein the one or more computing devices are further configured to filter the set of images by:
    determining an angle between a device that captured the representative image and a device that captured each respective image of the set of images; and
    removing any respective images where the angle between the device that captured the representative image and the device that captured the respective images is greater than a threshold angle value.

11. The system of claim 8, wherein the one or more computing devices are further configured to generate the time-lapsed sequence of images by organizing the images of the aligned filtered set of images based on timestamp information associated with each image of the aligned filtered set of images.

12. The system of claim 8, wherein the one or more computing devices are further configured to determine a first value by:
  determining a variance value between each pixel of sequential images in the time-lapsed sequence of images;
  identifying a first subset of images of the time-lapsed sequence of images and a second subset of images in the time-lapsed sequence of images where variance values between pixels of sequential images are lowest; and
  determining a time split variance value between the first subset of images and the second subset of images, wherein the first value is based on the time split variance value.

13. The system of claim 8, wherein the one or more computing devices are further configured to:
  determine variance values between pixels of sequential images in the time-lapsed sequence of images; and
  filter the time-lapsed sequence of images to remove images based on the variance values.

14. The system of claim 8, wherein the one or more computing devices are further configured to generate the time-lapsed sequence of images by averaging pixel values over two or more images of the aligned filtered set of images.

15. A non-transitory, tangible machine readable medium on which instructions are stored, the instructions, when executed by one or more processors, cause one or more processors to perform a method, the method comprising:
  identifying a set of images of a physical location;
  selecting a representative image of the set of images;
  filtering the set of images by comparing each image of the set of images to the representative image;
  aligning the images of the filtered set of images to the representative image;
  generating a time-lapsed sequence of images based on the aligned filtered set of images;
  determining a first value for the time-lapsed sequence of images based on changes in pixel values from one image in the sequence to the next image in the sequence at corresponding pixel locations; and
  in response to a request from a user computing device for a time-lapsed image representation of the physical location, providing the time-lapsed sequence of images.

16. The medium of claim 15, wherein the representative image is selected based on pairwise similarity values between each of the images of the set of images.

17. The medium of claim 15, wherein the method further comprises generating the time-lapsed sequence of images by organizing the images of the aligned filtered set of images based on timestamp information associated with each image of the aligned filtered set of images.

18. The medium of claim 15, wherein the method further comprises determining the first value by:
  between each pixel of sequential images in the time-lapsed sequence of images, determining a variance value;
  identifying a first subset of images of the time-lapsed sequence of images and a second subset of images in the time-lapsed sequence of images where variance values between pixels of sequential images are lowest; and
  determining a time split variance value between the first subset of images and the second subset of images, wherein the first value is based on the time split variance value.

19. The medium of claim 15, wherein the method further comprises:
  determining variance values between pixels of sequential images in the time-lapsed sequence of images; and
  filtering the time-lapsed sequence of images to remove images based on the variance values.

20. The medium of claim 15, wherein the method further comprises generating the time-lapsed sequence of images by averaging pixel values over two or more images of the aligned filtered set of images.

* * * * *